US008064443B2

(12) United States Patent
Scudder

(10) Patent No.: US 8,064,443 B2
(45) Date of Patent: Nov. 22, 2011

(54) SCALABLE ROUTING POLICY CONSTRUCTION USING DYNAMIC REDEFINITION OF ROUTING PREFERENCE VALUE

(75) Inventor: John Galen Scudder, Ann Arbor, MI (US)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 12/463,758

(22) Filed: May 11, 2009

(65) Prior Publication Data

US 2010/0284403 A1    Nov. 11, 2010

(51) Int. Cl.
H04L 12/28 (2006.01)
(52) U.S. Cl. ...................................................... 370/389
(58) Field of Classification Search .................. None
See application file for complete search history.

(56) References Cited

U.S. PATENT DOCUMENTS

| | | | |
|---|---|---|---|
| 7,457,290 B1 * | 11/2008 | Salama et al. ................ | 370/392 |
| 2002/0078223 A1 | 6/2002 | Baldonado et al. | |
| 2003/0039212 A1 | 2/2003 | Lloyd et al. | |
| 2005/0198382 A1 | 9/2005 | Salmi et al. | |
| 2006/0268681 A1 * | 11/2006 | Raza ............................. | 370/216 |
| 2007/0091793 A1 * | 4/2007 | Filsfils et al. ................ | 370/228 |
| 2007/0091794 A1 * | 4/2007 | Filsfils et al. ................ | 370/228 |
| 2010/0054241 A1 * | 3/2010 | Shah et al. ................... | 370/389 |

OTHER PUBLICATIONS

Siganos, George et al., "Analyzing BGP Policies: Methodology and Tool," Infocom 2004, 23rd Annual Joint Conference of the IEEE Computer and Communications Societies, vol. 3, pp. 1640-1651, Mar. 7, 2004 (12 pgs.).
Caesar, Matthew et al., "BGP routing policies in ISP networks," IEEE Network, vol. 19, Issue 6, Nov. 21, 2005 (8 pgs.).
Retana, Alvaro, et al., "BGP Custom Decision Process," Cisco Systems, Network Working Group, Internet Draft, Oct. 2002 (7 pgs.).
Rekhter, Y. et al., Request for Comments 4271, entitled "A Border Gateway Protocol 4 (BGP-4)", Jan. 2006 (98 pgs.).
Fuller, V. et al., Request for Comments 4632, entitled "Classless Inter-domain Routing (CIDR): The Internet Address Assignment and Aggregation Plan," Aug. 2006 (26 pgs.).
Rekhter et al., "A Border Gateway Protocol 4 (BGP-4)", Network Working Group, RFC 4271, IETF Standard, Internet Engineering Task Force, Jan. 2006, 90 pp.
Extended European Search Report for EP Application No. 10160376.9 dated Jun. 21, 2010, 8 pp.
Response to Extended European Search Report from European application No. 10160376.9, dated May 13, 2011, 15 pp.
Office Action received in corresponding EP Application No. 10160376.9, mailed Aug. 24, 2011, pp. 4.

* cited by examiner

Primary Examiner — Hassan Phillips
Assistant Examiner — Hicham Foud
(74) Attorney, Agent, or Firm — Shumaker & Sieffert, P.A.

(57) ABSTRACT

In general, techniques are described to dynamically redefine a preference value used during route resolution. A network device, such as a router, may implement the techniques to improve a usability aspect of the router. The router may comprise an interface card that receives messages describing one or more of a plurality of routes. The router may also include a control unit that stores data defining a policy. The policy may comprise rules by which the router determines the preference value for one of the plurality of routes. The policy dynamically redefines the preference value as two or more bit fields rather than viewing the preference value as an integer value. The control unit further sets each of the two or more bit fields of the local preference value in accordance with the policy and associates the at least one of the routes with the determined local preference value.

26 Claims, 5 Drawing Sheets

US 8,064,443 B2

SCALABLE ROUTING POLICY CONSTRUCTION USING DYNAMIC REDEFINITION OF ROUTING PREFERENCE VALUE

TECHNICAL FIELD

The invention relates to computer networks and, more particularly, routing data in computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

One type of computer device within the computer network, referred to a router, is responsible for routing the individual packets through the computer network from the source device that originated each packet to a destination device to which the packet is destined. To route the packets, each router of the computer network may store information describing routes through the network from each source device to each destination device. The routes may comprise a plurality of "hops" through the network, with the first hop of each route identifying the source, followed by one or more intermediate hops for each route identifying intermediate devices (such as the routers), and a final hop for each route identifying the destination. The routers may implement a routing protocol, such as a Border Gateway Protocol (BGP), to exchange routes with one another and thereby learn of all routes within the computer network, which may be referred to as the network topology.

After learning of this network topology, each of the routers may resolve the network topology to select a single path by which to reach a given destination from a given source. Often, a plurality of routes may be used to reach a given destination from a source, and each of the routers may select one of these overlapping routes through a process referred to as route resolution. The routers may perform a default form of route resolution defined by the particular routing protocol implemented by each of the routers or may alternatively perform a customized form of route resolution.

To customize the route resolution process, a network administrator or other user may define policies that influence the router's selection of routes during route resolution. For example, an administrator may define policies relating to the degree of trust for the peer from which the route was learned, for instance depending on whether the origin has been validated or is unknown or invalid. As another example, the administrator may define a policy forcing routing decisions to consider whether a route originated from a customer, peer, or transit provider. As a result, the router is often forced to evaluate a rich and complex set of variables when performing route resolution to rank and select routes. While customization may enable the network administrator to tailor how the router performs route resolution, for example, to meet particular contractual business agreements or obligations, defining and maintaining these policies may further burden already overburdened network administrators.

Although policies can be quite rich in terms of how to match routes, a challenge exists in determining the preference to be assigned to the routes, since they must ultimately be ranked by the routing protocol. Moreover, many conventional routing protocols (BGP, for example) are not particularly flexible in terms of allowing arbitrary ranking according to arbitrary criteria which were not considered ab initio. Thus, policies attempting to define complex ranking of routes often end up forcing the administrator to define exhaustive enumerations for the cross-product of all states and variables under consideration. Such policies may grow quite large and become unmanageable, especially from a human factors perspective, but also in terms of machine resources.

For example, consider the following pseudo-code to define a policy that assigns a local preference value based on a number or variables $V_1$-$V_N$ with each variable having "M" states, $S_1$-$S_M$:

```
policy {
    when [(V₁ == S₁) && (V₂ == S₁) && ... (V_N == S₁)]
    then local_pref = 1;
    when [(V₁ == S₂) && (V₂ == S₁) && ... (V_N == S₁)]
    then local_pref = 2;
    when [(V₁ == S₂) && (V₂ == S₂) && ... (V_N == S₁)]
    then local_pref = 3;
    ...
    when [(V₁ == S_M) && (V₂ == S_M) && ... (V_N == S_M)]
    then local_pref = N*M;
} end policy;
```

Considering the above pseudo-code used to define the policy, a number of local preference instantiations are required to be defined so as to account for each combination of variables of the states, $S_1$-$S_M$, of variables, $V_1$-$V_N$. In particular, as noted above, this example policy consists of a number of lines to define the local preference value equal to the cross product of the number of states, M, and the number of variables, N. Consequently, these types of policies may grow quite large and become unmanageable, especially from a human factors perspective, but also in terms of machine resources.

SUMMARY

In general, techniques are described in which a network device dynamically redefines during route resolution a preference value on which routes are ranked. That is, a routing protocol preference value may aggregate a plurality of user-defined variables, and may be dynamically considered as a single atomic value during route resolution so as to conform to the requirements of the routing protocol. A network device, such as a router may implement the techniques to improve a human usability aspect of the router so that fewer commands or rules need be entered to define a policy for preferential selection between overlapping routes during route resolution. Overlapping routes as used herein may refer to routes that reach or specify a same destination, e.g., by way of an address or address prefix.

The router may perform route resolution to select or otherwise "resolve" one of these overlapping paths by which to reach the destination address or address prefix. In some instances, the router may select one of these overlapping routes based on a comparison of a plurality of characteristics of each of the overlapping routes. Each of these characteristics may comprise two or more states, which may provide for a multiplicity of unique combinations.

Rather than input data defining a policy to map each of these unique combinations to a particular preference value, the router may implement the techniques described in this disclosure to dynamically redefine the atomic preference value, as defined by the routing protocol, as two or more bit fields, where each bit field independently represents a corresponding one of the route characteristics and defines a preference value for a state of the corresponding one of the route characteristics. The techniques may enable an administrator to interact with a user interface to input data specifying a linear, rather than an exponential, number of rules that define a mapping between bit fields and route characteristics. The techniques therefore may improve the human usability aspect of the router by enabling the specification of the mapping using fewer rules or commands while continuing to allow the routing protocol to consider the routing preference value as a single atomic value, thereby avoiding changes to routing protocol implementation.

In operation, the router may receive data or information defining a plurality of routes in accordance with a routing protocol, such as a Border Gateway Protocol (BGP). The router may also store data or information defining a policy that comprises the above described set of rules. The policy may generally dynamically redefine a preference value or other metric or attribute defined by the routing protocol, which is normally treated as an integer value by software compliant with the routing protocol, as a plurality of bit fields. Moreover, this dynamic redefinition may be applied by and recognized by a syntax supported by a user interface of the device, yet be transparent to the underlying routing process of the device.

For example, the user interface may support a construct in which a policy has a bit field instantiation that maps specific contiguous portions of the bits used to represent the integer preference value as two or more bit fields. The policy may then map each of these bit fields to a characteristic associated with a given route. These so-called route characteristics may include a neighbor relationship that defines a relationship between the router and the router responsible for generating and transmitting the route data, a validation state indicative of whether the advertized route has been validated, a bandwidth of the advertised route, and other common route characteristics. The policy may then define a mapping as a plurality of sub-mappings, where each sub-mapping maps all known or possible states of a route characteristic associated with a given one of the bit fields to a preference value associated with that state. In other words, the policy defines a sub-mapping for each one of the bit fields that maps each known or possible state of the route characteristic to a corresponding preference value. In this respect, the policy includes a set of rules on an order of an amount resulting from an addition, rather than multiplication, of the possible states for each of the route characteristics.

The router may apply this policy to newly received routes in order to determine a preference value for the route. For example, the router may receive a BGP update message defining a new route and determine a preference value, referred to as a local preference value in the context of BGP, for the route. The router may determine each of the states of the route characteristics mapped by the policy to the bit field based on the BGP update message and apply the policy to map each of these states to a corresponding preference value. The router may then set each of the logically defined bit fields within the local preference value to the corresponding preference value and associate the local preference values with the route in, for example, a route table. The router may then use this local preference value to resolve routes through the network. The router may, during route resolution, view or otherwise treat this local preference value as an integer. That is, the router during route resolution may, for overlapping routes, select those of the overlapping routes having a higher local preference. The techniques may enable control over this route resolution process inasmuch as a router may more efficiently specify a policy that defines a preference value for a route in a manner that permits more than one route characteristic to impact a value of a local preference value. This impact may facilitate preferential control over route resolution as described below in more detail.

In one embodiment, a method comprises storing, with a router of a network, information describing a plurality of routes, wherein each of the routes defines a sequence of hops through the network to a destination, and storing, with the router, data defining rules by which the router determines a local preference value for at least one of the plurality of routes, wherein the local preference value is specified by a routing protocol implemented by the router as an integer value, wherein the router, in accordance with the routing protocol, utilizes the local preference value during route resolution to rank and select one or more of the routes, and wherein the rules redefine the local preference value from an integer value specified by the routing protocol to two or more bit fields, and wherein the rules associate each of the bit fields with a different route characteristic and define a mapping, for each of the different route characteristics, that associates a bit-field preference value with each possible state of the corresponding route characteristic. The method also comprises determining, with the router, a state for each of the different route characteristics defined by the mapping, determining an integer value for the local preference value by setting, with the router, each of the two or more bit fields of the local preference value with one of the bit field preference values associated with the determined states in the policy mapping, and associating, with the router, the at least one of the routes with the determined integer value of the local preference value.

In another embodiment, a router comprises at least one interface card that receives a routing protocol message in accordance with a routing protocol, each of which defines information that describes one or more of a plurality of routes, wherein each of the routes defines a sequence of hops through the network to a destination. The router also comprises a control unit that stores data defining rules by which the router determines a local preference value for at least one of the plurality of routes, wherein the preference value is specified by the routing protocol implemented by the router as an integer value, wherein the router, in accordance with the routing protocol, utilizes the preference value during route resolution to rank and select one or more of the routes, and wherein the rules redefine the local preference value specified by the routing protocol as two or more bit fields, and wherein the rules associate each of the bit fields with a different route characteristic and define a mapping, for each of the different route characteristics, that associates a bit field preference value with each possible state of the corresponding route characteristic. The control unit further determines a state for each of the different route characteristics defined by the mapping, sets each of the two or more bit fields of the local preference value with one of the bit field preference values associated with the determined states in the mapping and associates the at least one of the routes with the determined integer value of the local preference value.

In another embodiment, a network system comprises a first autonomous system that includes a first router and a second autonomous system that includes a second router. The second router comprises at least one interface card that receives a routing protocol message in accordance with a routing protocol from the first router, each of which defines information that describes one or more of a plurality of routes, wherein each of the routes defines a sequence of hops through the network to a destination and a control unit that stores data defining rules by which the router determines a local preference value for at least one of the plurality of routes. The preference value is specified by the routing protocol implemented by the second router as an integer value, wherein the second router, in accordance with the routing protocol, utilizes the preference value during route resolution to rank and select one or more of the routes. The rules redefine the local preference value specified by the routing protocol as two or more bit fields. The rules also associate each of the bit fields with a different route characteristic and define a mapping, for each of the different route characteristics, that associates a bit field preference value with each possible state of the corresponding route characteristic. The control unit further determines a state for each of the different route characteristics defined by the mapping, sets each of the two or more bit fields of the local preference value with one of the bit field preference values associated with the determined states in the mapping and associates the at least one of the routes with the determined integer value of the local preference value.

In another embodiment, a computer-readable storage medium comprising instructions for causing a programmable processor to store, with a router of a network, information describing a plurality of routes, wherein each of the routes defines a sequence of hops through the network to a destination and store, with the router, data defining rules by which the router determines a local preference value for at least one of the plurality of routes. The local preference value is specified by a routing protocol implemented by the router as an integer value. The router, in accordance with the routing protocol, utilizes the local preference value during route resolution to rank and select one or more of the routes. The rules redefine the local preference value from an integer value specified by the routing protocol to two or more bit fields. The rules also associate each of the bit fields with a different route characteristic and define a mapping, for each of the different route characteristics, that associates a bit-field preference value with each possible state of the corresponding route characteristic. The instructions further cause the programmable processor to determine, with the router, a state for each of the different route characteristics defined by the mapping, determine an integer value for the local preference value by setting, with the router, each of the two or more bit fields of the local preference value with one of the bit field preference values associated with the determined states in the policy mapping, and associate, with the router, the at least one of the routes with the determined integer value of the local preference value.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
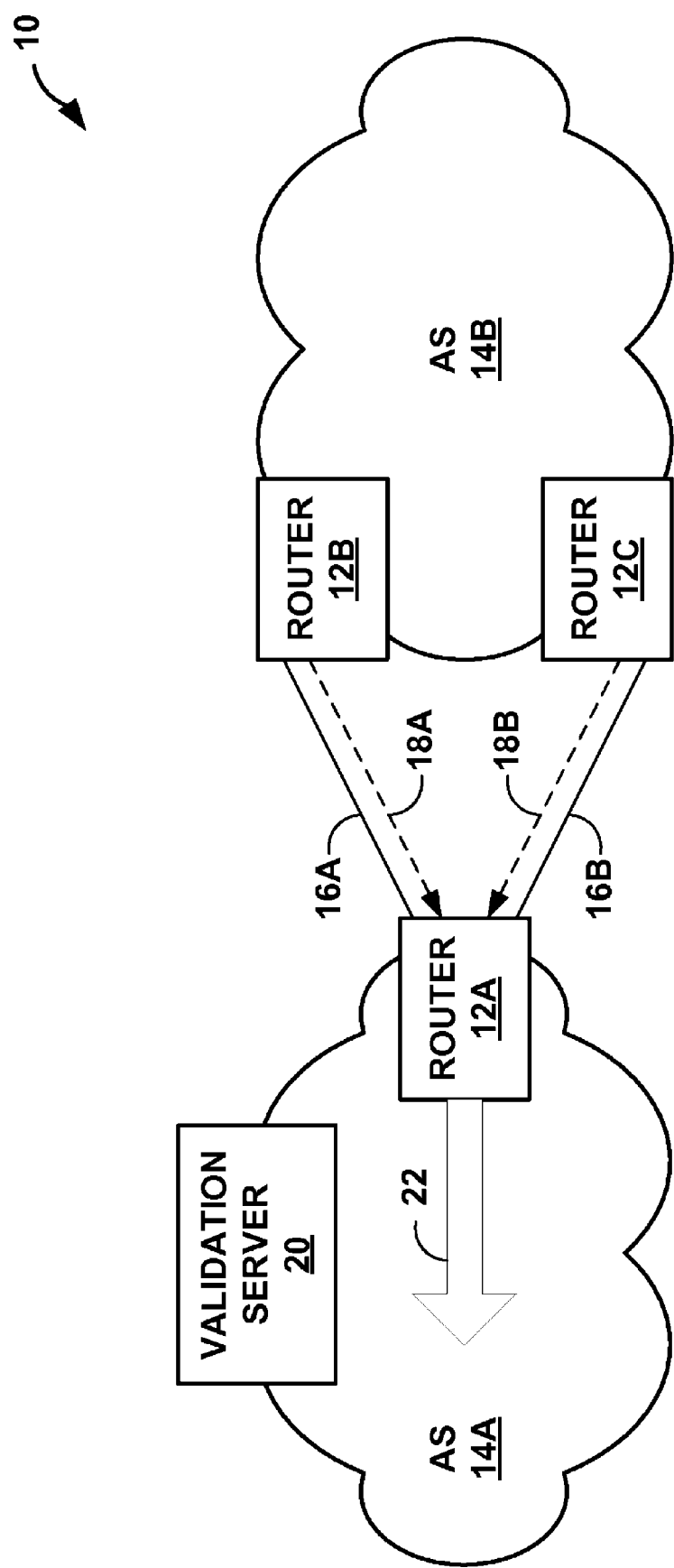
FIG. 1 is a block diagram illustrating an example network system in which a router implements the techniques described in this disclosure to dynamically redefine a preference value used by a routing protocol during route resolution.

FIG. 1 is a block diagram illustrating an example network system 10 in which a router 12A implements the techniques described in this disclosure to dynamically redefine a preference value used during route resolution. Router 12A may, as described below, implement the techniques to improve a human usability aspect of router 12A so that fewer commands and/or less complex configuration data need be entered to define policies for preferentially selecting between overlapping routes during route resolution. Overlapping routes as used herein refers to routes that reach a same destination address or address prefix.

Router 12A may perform route resolution to select or otherwise "resolve" one of these overlapping paths by which to reach the destination address or address prefix. In some instances, router 12A may select one of these overlapping routes based on a comparison of a plurality of characteristics of each of the overlapping routes. To influence this route selection process, routing protocol standards typically define a local preference variable as a single, atomic integer value, that can be introduced into the ranking and selection algorithm applied by the routing protocol. By associating different local preference values with different routes, an administrator is able to configure routers in a network to preferentially select certain routes based on the characteristics of those routes. However, each of these characteristics may be expressed as two or more states (e.g., trusted or un-trusted, interior or exterior), which results in cross-product multiplicity of unique combinations that the administrator is required to specify in accordance with routing protocols standards.

In contrast, rather than require the administrator to input data defining a policy to map each of these unique combinations to a particular integer preference value recognized by the routing protocol, router 12A may implement the techniques described in this disclosure to allow the integer preference value to be dynamically defined as a data word containing two or more bit fields, where each bit field independently represents a corresponding one of the route characteristics and defines a preference value for that particular route characteristic. As a result, an administrator may independently define rankings for each of the route characteristics, which the router then transparently aggregates into bit fields of the routing protocol preference value for input into the routing protocol as a single, atomic value. The techniques may enable an administrator to first input data independently defining a linear mapping between any of the bit fields and a corresponding one of the route characteristics, and subsequently enter policy data for the route characteristics as an independent local preference value without necessarily needing to take into account the other characteristics. In operation, router 12A dynamically combines the local preference values for the different route characteristics into the bit fields in accordance with the defined mapping so as to compute a single, composite local preference value in a format that conforms to the format required by the routing protocol standard, e.g., an atomic integer local preference value. In this way, compliance with routing protocol standards is met, yet the techniques allow the user to avoid having to define policy data that specifies the local preference value for the routing protocol as the multiplicity of unique combinations of route characteristics and their respective possible states. In this respect, router 12A may implement the techniques to improve a human usability aspect of router 12A while avoiding modifications to the underlying routing protocol or the algorithm implemented by the routing protocol when ranking and selecting routes in view of a single local preference value.

While described with respect to a particular network device, e.g., router 12A, the techniques may be implemented by any type of network device capable of executing or otherwise implementing a routing protocol by which to receive information describing routes through a network. Moreover, the following disclosure describes the techniques with respect to a particular routing protocol referred to as a Border Gateway Protocol (BGP) and a preference value defined by BGP referred to as a local preference ("local_pref") value. More information regarding BGP and the local preference value, as well as, the BGP route resolution or decision process may be found in Request For Comments (RFC) 4271, entitled "A Border Gateway Protocol 4 (BGP-4)," dated January 2006, and herein incorporated by reference in its entirety. The techniques may, however, be implemented with respect to other routing protocols, such as an Intermediate System-to-Intermediate System (IS-IS) routing protocol, an interior Border Gateway Protocol (iBGP), an Open Shortest Path First (OSPF) routing protocol, and an Enhanced Interior Gateway Routing Protocol (EIGRP), to dynamically redefine a preference or other value normally defined by the routing protocol to be an integer value as a plurality of two or more bit fields.

As shown in FIG. 1, network system 10 includes an autonomous system 14A ("AS 14A") and an autonomous system 14B ("AS 14B"). Each of autonomous systems 14A, 14B ("autonomous systems 14" or "ASes 14") may comprise a separate computer network addressable by one or more address prefixes. Typically, ASes 14 comprise packet-based computer networks that implement a layer three (L3) packet-based protocol, such as an Internet Protocol (IP), where L3 refers to the third layer of the Open Systems Interconnection (OSI) model. For this reason, ASes 14 may each be referred to as a "packet-based" network or an "IP" network. For packet-based networks, ASes 14 may be addressable by way of one or more IP address prefixes, which may be defined in accordance with a notation described in Request For Comments 4632, entitled "Classless Inter-domain Routing (CIDR): The Internet Address Assignment and Aggregation Plan," dated August 2006, and herein incorporated by reference in its entirety.

ASes 14 may each comprise a sub-network or subnet, for short, of a larger public network, such as the Internet. Commonly, a single service provider, such as Verizon Communications Incorporated, maintains and operates its network as a single autonomous system. In some instances, however, a single service provider may maintain and operate its network as two or more autonomous systems. This multiple AS instance generally only occurs when one service provider acquires or otherwise purchases another service provider's network but does not for business or technical reasons combine the two ASes. It is assumed herein for illustrative purposes that a single service provider, such as Verizon Communications Incorporated, maintains and operates AS 14A, while another service provider, such as American Telephone & Telegraph (AT&T) Incorporated, maintains and operates AS 14B. While shown as consolidated clouds in FIG. 1, each of ASes 14 may span large geographical distances and possibly may span continents (and even oceans to reach multiple continents).

As further shown in the example of FIG. 1, AS 14A includes router 12A and AS 14B includes routers 12B and 12C. Routers 12A-12C ("routers 12") may be similar, if not substantially similar, to one another in terms of functional operation, although routers 12 may each include different hardware and/or software by which to implement this similar or same functionality. In any event, each of routers 12 generally reside at an edge of respective ASes 14 and router 12A couples to routers 12B and 12C via respective network link 16A and 16B. Typically, these links 16A, 16B ("links 16") comprise high-bandwidth or high-capacity inter-network links that comprise a backbone of large public networks, such as the Internet. For this reason, links 16 may be referred to as backbone links 16.

Routers 12 each implement a routing protocol, such as BGP, to exchange topology data describing routes through each of their respective ASes 14. This exchange typically takes the form of route advertisements or route withdrawals in accordance with topology changes of the network. A route is expressed as a plurality of hops, e.g., as denoted by addresses, to reach a network destination, e.g., denoted by a network address or network address prefix. Routers 12 may include a database to store data defining routes through their respective ASes 14. These routes are referred to as internal or interior routes. Routers 12 may implement additional routing protocols to learn of these interior routes. This class of interior routing protocols may generally be referred to as Interior Gateway Protocols (IGP). IGPs commonly include any routing protocol that is used within an autonomous system. Example IGPs includes a Routing Information Protocol (RIP), an Interior Gateway Routing Protocol (IGRP), and the above mentioned OSPF and IS-IS routing protocols.

BGP, unlike the IGP class of routing protocols, generally operates to exchange routes between routers of different autonomous systems. Routers 12 may learn of the interior routes via one or more IGPs and populate a Routing Information Base (RIB), which may comprise a database or other storage device, with one or more of the learned routes. Router 12 may, in some instances, reject one or more of the learned routes before inserting these routes into the RIB. The RIB may store a routing table or other data structure by which to store the accepted or non-rejected routes and route characteristics concerning each route inserted into the route table. Route characteristics may include a validation state of a route, a community to which the router providing the route belongs, a peering state of a neighboring router, a maximum total bandwidth consumed by traffic along the route, a current or available bandwidth, a reserved bandwidth, a cost associated with the route, color, jitter, transport media type, transmission speed, an Autonomous System (AS) path ("AS_Path"), an IGP area or level of source route, a source protocol, a source instance, an origin attribute (e.g., a BGP ORIGIN attribute, or any other characteristic normally associated with, defined for or determinable for a route by a router.

Each of routers 12 may, after populating the routing table with these routes, select routes stored to the routing table for exporting to the other routers 12 in accordance with BGP. Routers 12 may generate a BGP message referred to as a BGP update message that defines a single route (and often a plurality of routes) as well as some of the route characteristics associated with that route (or the plurality of routes). This single route may represent a route selected by router 12A to reach a particular destination address or address prefix from router 12A. Router 12A may for example generate a BGP update message indicating a route or path through AS 14A. Router 12A may send a BGP update message for each route or plurality of routes router 12A selects to export to AS 14B. Likewise, routers 12B, 12C may generate and transmit to router 12A a BGP update message for each route or plurality of routes router 12B, 12C, respectively, select to export. FIG. 1 shows these BGP update messages from routers 12B, 12C to router 12A as respective BGP update messages 18A, 18B ("BGP update messages 18").

In response to these update messages 18, router 12A may first determine what preference value to assign to each of the routes included within the BGP update messages 18. This preference value in the context of BGP is referred to as "local preference" and "local_pref" refers to an integer variable that stores an integer denoting this local preference value. Typically, router 12A only assigns a local preference value to routes received from external peers or those neighboring or adjacent routers that reside in a different autonomous system external from the autonomous system in which router 12A resides. Routers 12B and 12C are examples of such external BGP peers and therefore may be referred to collectively as external peers 12 or external BGP peers 12. As the routes are received from external peers, router 12A may, in accordance with BGP, assign a local preference to each of these routes.

Router 12A may utilize this determined local preference value as defined by the "local_pref" variable during route resolution, which is a process whereby router 12A selects or resolves one of a plurality of overlapping routes. As described above, overlapping routes may refer to routes that both reach the same destination address or address prefix. It is assumed for purposes of illustration that at least one route defined by one of BGP update messages 18A and at least one route defined by one of BGP update messages 18B overlap in the manner described above. BGP specifies a seven step process to resolve these overlapping routes.

Router 12A may implement this seven step BGP route resolution (or "decision process" as it is referred to in the above incorporated RFC 4271) to consider first the integer local preference value associated with each route. When executing the BGP protocol, router 12A may select the one of the overlapping routes associated with the highest local preference value of the routing protocol, i.e., the highest integer value in this example. Second, if two or more overlapping routes are associated with the same local preference value, router 12A attempts to resolve this tie based on which of these overlapping routes is associated with a lowest AS path length value. If a tie between two or more overlapping routes still results, router 12A then attempts to resolve the tie based on which of these overlapping routes is associated with a lowest origin type value. If a tie between two or more overlapping routes still results, router 12A next attempts to resolve the tie based on which of these overlapping routes is associated with a lowest Multi_Exit_Disc (MED) value. Fifth, if a tie between two or more overlapping routes still results, router 12A attempts to resolve the tie based on which of these overlapping routes is learned via BGP rather than an IGP, such as interior BGP (iBGP). Sixth, if a tie between two or more overlapping routes still results, router 12A attempts to resolve the tie based on which of these overlapping routes is associated with a lowest cost to router 12. Seventh, if a tie between two or more overlapping routes still results, router 12A attempts to resolve the tie based on which of these overlapping routes is associated with a lowest router identifier (ID) value.

Routers 12 that implement BGP may provide this BGP route resolution or decision process as a default decision process. In other words, BGP may require routers that implement BGP to provide this route resolution or decision process as a default route resolution process. In this respect, the default route resolution process comprises a "compiled in" set of rules that define a default decision process. However, routers 12 may also each enable a tailored or custom route resolution or decision process. Routers 12 may offer this tailored or custom route resolution process to enable network administrators to prefer or otherwise select one route for technical and/or business purposes.

For example, assuming Verizon owns AS 14A and AT&T owns AS 14B, Verizon may, rather than build up AS 14A to enter a particular geographical location, contract with AT&T, whose AS 14B already spans that geographical location, to carry Verizon traffic for an amount of money equal to the bandwidth consumed within AS 14B. Verizon router 12A may however receive overlapping routes from routers 12B and 12C and wish to always select the shortest and therefore less bandwidth consuming route to reduce the contractual cost. Without some form of customizable or tailored route resolution process, router 12A may not always select the lowest cost route to the destination. As a result, routers 12 typically each enable a tailored or custom route resolution or decision process.

Router 12A may for example include a user interface by which to receive data defining policies that control or customize the default route resolution process. The administrator may define these policies via a Routing Policy Specification Language (RPSL), which is defined in various RFCs, such as RFC 2622, entitled "Routing Policy Specification Language (RPSL)," dated June 1999. The administrator may interact with a provisioning system or other computing device to generate the policy in RPSL, which the provisioning system or other computing device may then convert into router configuration scripts or files that the administrator then inputs as "policies" to router 12A via the user interface. In any event, administrators typically control the default BGP route resolution process by defining policies that map particular routes to a particular local preference value. In this manner, network administrators may control the above defined route resolution process by assigning a higher local preference value to one of the plurality of overlapping routes than all of the other plurality of overlapping routes. In this manner, routers 12 may enable network administrators to control route resolution in a set manner.

In accordance with the techniques of the invention, router 12A receives via the user interface data defining a bit-wise policy that defines rules by which the router determines a local preference value for a single parameter defined by an industry standard routing protocol for at least one of the plurality of routes received via one of BGP update messages 18. While the local preference value is viewed by BGP implemented by router 12A as an integer value, in conformance with the industry standard, the policy allows the router to dynamically redefine the local preference value as two or more bit fields when interacting with the user. In this respect, router 12A views the local preference value as a plurality of bit fields with respect to user interface syntax and data presentation, but utilizes the local preference value as a single integer value in compliance with the industry standard routing protocol when performing routing operations. The policy associates each of the bit fields with a different one of the above route characteristics and defines a mapping, for each of the different route characteristics, associating a preference value with each possible state of the corresponding route characteristic.

For example, a policy can be defined to contain a bit field instantiation that instructs router 12A to subdivide the local preference integer field into two bit fields and associate each of these bit fields with a respective one of the two route characteristics: a validation type of the route and a neighbor relationship type. As shown in FIG. 1, AS 14A may include a validation server 20 that includes a validation database (not shown in FIG. 1) for storing validation states associated with particular routes. Validation server 20 may act as a part of a Resource Public Key Infrastructure (RPKI). Particularly, validation server 20 may operate as a part of RPKI within a BGP context in the manner described in more detail in Internet Draft, entitled "Validation of Route Origination in BGP using Resource Certificate PKI," dates Oct. 6, 2008. Router 12A may generate and transmit validation requests to validation server 20 requesting that validation server 20 validate a particular route.

While shown as a separate validation server 20 with which router 12A may communicate to learn or otherwise determine a validation state associated with a route, router 12A may maintain an internal validation database for AS 14A. In some instances, validation states may be transmitted via BGP update messages and stored within the route table, where the route table may therefore comprise an internal validation database. In other instances, validation server 20 may be maintained by a plurality of ASes and used to validate routes for each of the member ASes.

Validation server 20 may, as an alternative, comprise an Internet Routing Registry (IRR). The IRR may include a database that stores data defining one or more Internet route objects for determining and sharing route and related information used for configuring routers. Often, the IRR is used to avoid problematic issues between Internet Service Providers, such as Verizon and AT&T and their respective ASes 14. The objects may comprise RPSL objects and network administrators for each of ASes 14 may modify those RPSL objects that define route objects for their respective ASes 14. The other network administrators may query those route objects not maintained for their one of ASes 14, but may not modify them. In this way, the IRR represents a database by which administrators may query and thereby learn of policies and routes through adjacent ASes. These RPSL objects may define a validation state for a route or plurality of routes and router 12A may query this IRR to learn of the validation state for a particular route. Common validation states comprise a valid state, an invalid state and an unknown state.

Router 12A may learn of neighbor types by way of BGP update messages or by querying validation server 20. Alternatively, these neighbor relationships may be defined as a part of the router configuration, which is generally specified by a network administrator. These neighbor relationships may generally define a business relationship with an adjacent network device of a different AS than that in which router 12A resides. Common types of neighbor relationships may comprise a transit relationship, a customer relationship, and a peer relationship.

In any event, router 12A may determine a state for each of the different route characteristics defined by the policy mapping. Continuing the above example, router 12A may determine a validation state and a neighbor relationship state for each of the routes received via BGP update messages 18. Router 12A may then set each of the two or more bit fields of the local preference value with a respective one of the preference values associated with the determined states in the policy mapping. Again, with respect to the above example, router 12A may determine for one of the routes defined by BGP update messages 18A, a valid state and a transit relationship, and set the first bit field delineated by the policy bit field instantiation with a first bit field preference value associated with the valid state in the policy mapping and the second bit field delineated by the policy bit field instantiation with a second bit field preference value associated with the transit relationship state in the policy mapping. In this manner, router 12A may set each bit field dynamically defined for the local preference value with separate, independent bit field preference values.

By dynamically redefining the local preference value as bit fields, router 12A may enable administrators to more easily define policies by which to preferentially select two or more overlapping routes. Assuming for purposes of illustration that an administrator wishes to select routes first on the validation state and second on the neighboring relationship, the administrator may define the above example policy instantiating the first 16 bits of the 32 bit local preference value as a validation state bit field and the second 16 bits of the 32 bit local preference value as a neighbor relationship bit field. The administrator may then define a first mapping under the bit field instantiation that maps each possible state the validation route characteristic to a first set of bit field preference values, and a second mapping that maps each possible state for the neighbor relationship route characteristic to a second set of bit field preference values.

For example, the first mapping may map a valid state to a bit field preference value of $10_2$, an unknown state to a bit field preference value of $01_2$, and an invalid state to a bit field preference value of $00_2$. The second mapping may map a customer neighbor relationship to a bit field preference value of $10_2$, a peer neighbor relationship to a bit field preference value of $01_2$, and a transit peer relationship to a bit field preference value of $00_2$. Upon determining that a first route is associated with a valid state and a transit relationship, router 12A may associate the route with a local preference value of $0002\ 0000_{16}$ in accordance with the first and second policy mappings. Upon determining that a second route is associated with a valid state and a peer relationship, router 12A may associate the route with a local preference value of $0002\ 0001_{16}$ in accordance with the above two exemplary policy mappings.

While referred to as first and second mappings, the plurality of independent mappings may be generally referred to as the policy mapping and hence may be construed as sub-mappings or per-characteristic mappings that make up or otherwise form the policy mapping. Regardless, the policy mapping contains a total of six mappings that map the three possible states of the validation route characteristic to bit field preference values for the upper or most significant bits of the local preference value and the three possible states for the neighbor relationship route characteristic to bit field preference values for the lower half or least significant bits of the local preference value. In other words, the policy mapping comprises a number of mappings that increases linearly to the sum total of the possible states for each route characteristic.

Moreover, while described above with respect to binary and hexadecimal representations, an operator, such as a network administrator, may define these values of 0, 1 and 2. Thus, the representations as binary and hexadecimal numbers is shown for purposes of illustrating various aspects of the techniques described in this disclosure related to the actual computation of the local preference value. Yet, the techniques may automatically convert a decimal representation of these numbers into the binary and hexadecimal representation shown above, as is common for most computers.

After setting or otherwise determining the local preference value for each of the routes in accordance with the techniques, router 12A may associate the each of the routes with the determined local preference value. Router 12A may associate these local preference values with the routes by storing the local preference value in the route table of the RIB alongside each of the routes. Router 12A may next perform route resolution to resolve overlapping routes.

As mentioned above it is assumed that at least two routes are received via separate BGP messages 18 that both reach the same destination. Assuming further, for illustrative purposes, that the first overlapping route is associated with a local preference value of $0002\ 0000_{16}$ determined in accordance with the above techniques and the second overlapping route is associated with a local preference value of $0002\ 0001_{16}$, again determined in accordance with the above techniques, router 12A may select the second overlapping route as the local preference value associated with this second overlapping route is greater than the local preference value associated with the first overlapping route. In other words, router 12A performs the default BGP route resolution or decision process described above to resolve these two overlapping routes and thereby leverages this default, built-in or compiled-in BGP decision process to utilize this dynamically redefined local preference value.

The BGP decision process continues to view this local preference value as an integer and as a result the BGP decision process need not be modified to accommodate to these techniques. That is, for example, the BGP decision process views the first local preference value associated with the first overlapping route as $8193_{10}$ and the second local preference value associated with the second overlapping route as $8194_{10}$. As 8194 is greater than 8193, router 12A selects the second overlapping route rather than the first in accordance with the BGP decision process. However, by redefining the local preference value in accordance with the techniques, the administrator need only define a policy that includes a linear number of mappings rather than a exponential number of mappings on the order of, for example, three times three or nine mappings.

While the example described above considers only two bit fields for route characteristics having relatively few states, the techniques may substantially improve the human usability aspect when an administrator desires to control route resolution for a number of route characteristics having a number of states each. Consider, for example, when an administrator desires to control route resolution based on three route characteristics that each have 10 possible states. In accordance with the techniques, the administrator may define a policy that dynamically redefines the local preference value into three bit fields and specifies three sub-mappings, each sub-mapping defining 10 rules that map each of the 10 states to a bit field preference value. This policy therefore defines the policy mapping using a total number of rules equal to or on the order of 30 which is linear to the sum total of the number of possible states for each route characteristic (i.e., 10+10+10). Rather than define the mapping as an exponential number of rules or commands on the order of 10×10×10 (or $10^3$), which equals 1000 mappings, an administrator may define the mapping as a set of 30 rules, which may greatly improve the human usability of router 12A with respect to controlling the route resolution process.

After resolving these overlapping routes in the manner described above, router 12A may communicate the resolved routes to AS 14A via one or more routing protocols, such as IBGP. These internal communications are shown as messages 22 in FIG. 1. Router 12A may communicate the local preference value determined above, and the other network devices, e.g., routers, internal to AS 14A may view this local preference value as an integer. In this respect, the techniques do not require any modification to the BGP protocol or any other protocol and the other internal routers may utilize this local preference value, as the techniques only dynamically redefine the local preference value logically and do not otherwise modify or extend BGP update messages or any other messages that utilize the local preference value. The techniques therefore maintain functional interoperability with other routers. Moreover, the techniques do not require any additional attributes or additions to update messages and therefore may conserve the bandwidth of AS 14A.

Figure 2:
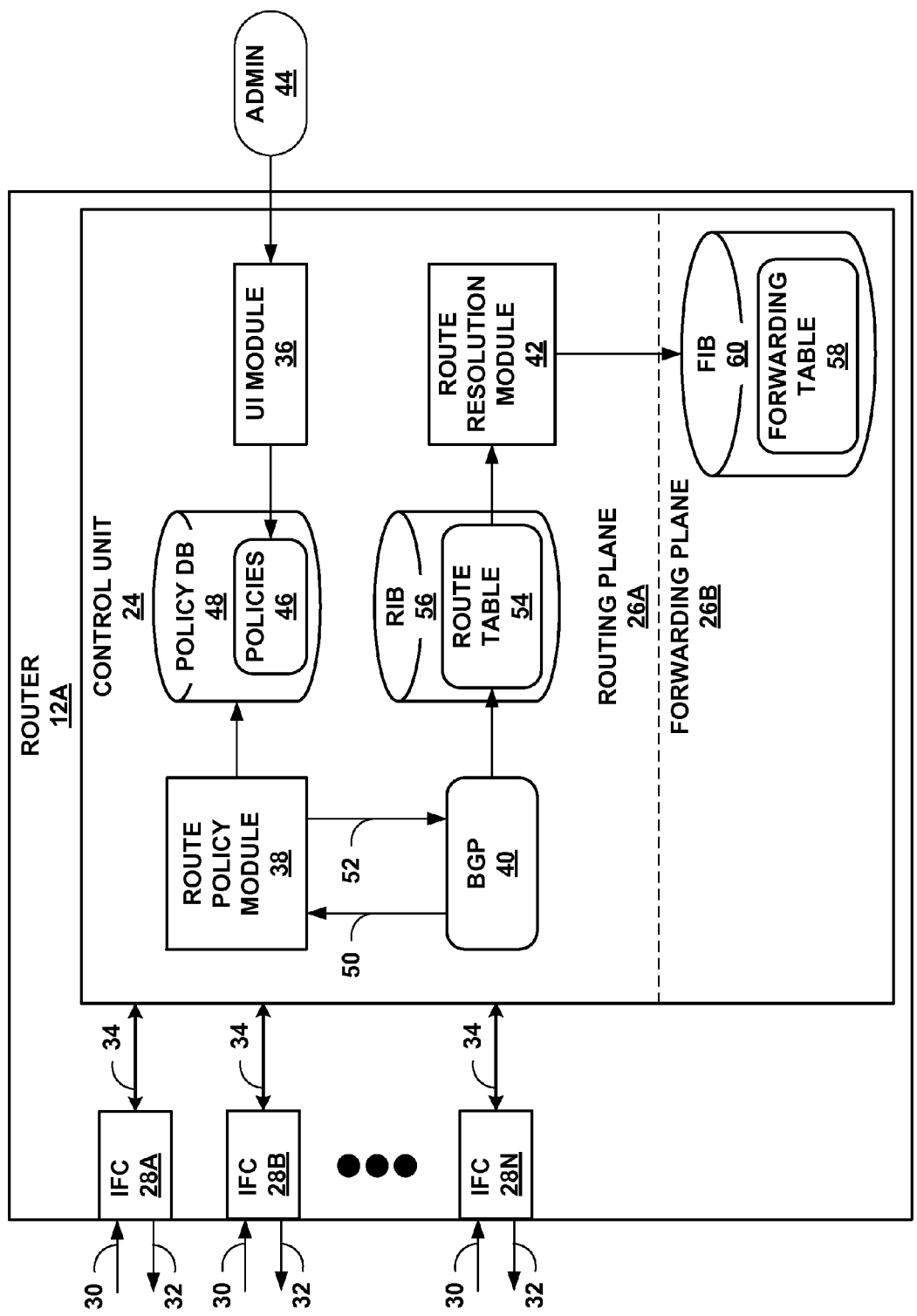
FIG. 2 is a block diagram illustrating an example embodiment of the router of FIG. 1.

FIG. 2 is a block diagram illustrating an example embodiment of router 12A of FIG. 1. As shown in FIG. 2, router 12A includes a control unit 24 that comprises a routing plane 26A and a forwarding plane 26B. Control unit 24 may comprise any combination of hardware and software that implement the techniques described in this disclosure. Control unit 24 may comprise one or more processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein. These instructions may form a computer or software program or other executable module that the programmable processor executes to perform the functionality described herein, including the functionality attributed to the techniques of this disclosure Routing plane 26A may generally represent a portion of control unit 24 responsible for implementing routing protocols, storing and maintaining data reflective of a network topology, such as route information, and resolving overlapping routes. Routing plane 26A may be referred to as a control plane inasmuch as routing plane 26A provides control over decisions regarding general routing functionality, such as route resolution. Routing plane 26A may also be referred to as a routing engine in that routing plane 26A provides in various aspects one or more engines or modules by which to perform this functionality.

Forwarding plane 26B may generally represent another portion of control unit 24 that is responsible for forwarding data units, such as packets. Forwarding plane 26B may receive resolved routes from routing plane 26B and forward the packets via the resolved routes. Forwarding plane 26B may comprise dedicated hardware specially designed for forwarding the packets as quickly as possible or, better stated, at a high-speed so as to provide high bandwidth forwarding. Forwarding plane 26B may also be referred to as a forwarding engine inasmuch as forwarding plane 26B may provide for dedicated hardware and/or software modules to forward the packets. Forwarding plane 26B may also be referred to as a data plane in that that forwarding plane 26B handles the forwarding of data units, e.g., packets, while routing plane 26A handles the control or decisions over routing functionality.

While described above as residing within the same control unit, e.g., control unit 24, routing plane 26A and forwarding plane 26B may be implemented separately such that routing plane 26A executes or is implemented in a first control unit and forwarding plane 26B executes or is implemented in a second control unit different or entirely separate from the first control unit. The techniques therefore should not be limited to the exemplary embodiment shown in FIG. 2.

Router 12A also includes a plurality of interface cards (IFCs) 28A-28N ("IFCs 28") for communicating packets via inbound links 30A-30N ("inbound links 30") and outbound links 32A-32N ("outbound links 32"). Each of IFCs 28 may couple to and communicate with control unit 24 via a switch (not shown in FIG. 2). This switch may comprise any communication medium capable of communicatively coupling one or more endpoints, e.g., IFCs 28 and control unit 24. IFCs 28 are shown as connecting to control unit 24 via links 34. These links 34 may or may not include the above described switch. In instances where router 12A does not include the switch, links 34 may each comprise a dedicated link or bus by which IFCs 28 communicate with control unit 24. Forwarding plane 26B may receive packets forwarded via links 34 from IFCs 28 and forward those packets via links 34 and IFCs 28 on outbound links 32. In this manner, forwarding plane 26B provides the forwarding functionality of router 12A.

Routing plane 26A includes a user interface module 36 ("UI module 36"), a route policy module 38, a BGP module 40 ("BGP 40"), and a route resolution module 42. UI module 36 comprises a hardware and/or software module that presents one or more user interfaces with which an administrator, such as admin 44, may interact to enter or otherwise input data defining policies 46. UI module 36 may comprise a graphical user interface (GUI) or a command line interface (CLI). Routing plane 26A may further include a policy database 48 ("policy DB 48") that stores the data defining policies 46.

Route policy module 38 may comprise a hardware and/or software module that applies one or more of policies 46 to routes 50 received from BGP module 40. Policies 46 may comprise at least one of the above described policies that dynamically redefine the local preference integer value as a plurality of bit fields. Route policy module 38 may apply this one of policies 46 to return a local preference value 52 associated with route 50 in accordance with the techniques described in this disclosure. BGP 40 may comprise a hardware and/or software module that implement BGP to at least receive and process BGP update messages, such as BGP update messages 18, generate and transmit BGP update messages, and otherwise maintain route table 54. Routing plane 26A may further include a routing information base 56 ("RIB 56"), which may comprise a database or other storage device, that stores route table 54. While shown as two separate databases 48 and 56, routing plane 26A may include a single database that stores both policies 46 and route table 54. The separate databases 48 and 56 are shown in FIG. 2 merely for illustrative purposes.

Route resolution module 42 may comprise a hardware and/or software module that performs route resolution in accordance with BGP. Route resolution module 42 may, in other words, implement the default decision process described in the above incorporated RFC 4271. Route resolution module 42 may perform this route resolution process to select between overlapping routes as described above and install this selected one of the overlapping routes within a forwarding table 58 of forwarding plane 26B. Forwarding plane 26B may include a forwarding information base ("FIB 60"), which comprises a database or other storage device, that stores forwarding table 58. To install a route, route resolution module 42 may issue a command 62 to FIB 60 that causes FIB 60 to update forwarding table 58 with an entry defining a next hop associated with a given source address or address prefix.

Initially, admin 44 may interact with a user interface presented by UI module 36 to input data defining policies 46. While described as admin 44 interacting directly with the user interface, admin 44 may interact with a provisioning system or other intermediate configuration system to specify the policy, often in accordance with RPSL. This intermediate configuration system then converts the RPSL compliant policy into a script or other data defining the above described mappings and then automatically loads this one of policies 46 into policy DB 48 via automated interactions with the user interface presented by UI module 36. In this respect, admin 44 may indirectly interact with the user interface. Regardless, UI module 36 may receive this data defining policies 46 and load this data into policy DB 48, which stores this data as policies 46. Admin 44 may then activate, start, or otherwise enable router 12A to begin receiving packets.

Forwarding plane 26B may receive packets via IFCs 28 and respective inbound links 30, access forwarding table 58 of FIB 60 and determine a "next hop" to which to forward the packet. Forwarding plane 26B may parse or otherwise extract a five-tuple from a header of each packet, where the five-tuple comprises a source IP address, a destination IP address, a source port, a destination port, and a protocol identifier. Forwarding plane 26B may access forwarding table 58 using the five-tuple or some portion thereof, such as the destination address, as a key to locate an entry of forwarding table 58 corresponding to the five-tuple. The entry may identify one of IFCs 28 or alternatively, in instances where the packet is destined for router 12B, indicate that the packet should be forwarded to routing plane 26A.

As an example, forwarding plane 26B may receive a BGP update message, such as one of BGP update messages 18, destined for router 12A. Forwarding plane 26B may extract the five-tuple or some portion thereof, such as the destination address, and access forwarding table 58 to retrieve an entry indicating that the packet is to be forwarded to routing plane 26A. Forwarding plane 26B may forward this one of BGP update messages 18 to routing plane 26A. Routing plane 26A may invoke BGP 40 to handle this one of BGP update messages 18. BGP 40 may extract route 50 defined by the one of BGP update messages 18 and determine whether to calculate a local preference value for this route. BGP 40 may base this determination on a known configuration of a BGP peer. If the BGP peer is an external peer, e.g., the peer has a different AS number from the AS number associated with AS 14A, BGP 40 may calculate a local preference number for this route. However, if the BGP peer is configured as an internal peer, e.g., the peer has the same AS number as the AS number associated with AS 14A (or the AS in which router 12 resides), BGP 40 may determine not to calculate a local preference number for this route.

As it is assumed that this is one of BGP update messages 18 is received from a peer configured as an external BGP peer, BGP 40 therefore decides to calculate a local preference value for this route and extracts the route defined by this one of BGP update messages 18. In order to calculate the local preference number, BGP 40 forwards this route as route 50 to route policy module 38, which applies one of policies 46 to determine a local preference value for this route 50.

In particular, route policy module 38 applies the one of policies 46 that dynamically redefines the local preference value from an integer, as specified by the industry standard routing protocol, to a plurality of bit fields with respect to user interaction and provisioning of configuration data. Route 50 may not only define a series of hops from a source device to a destination device, but also in some instances define the route characteristics as well. Alternatively, route policy module 38 may access RIB 56 to determine the route characteristics associated with route 50. In any event, route policy module 38 determines a state for each route characteristic associated with each of the bit fields defined by the bit field instantiation of the one of policies 46. Based on the determined state for each of the route characteristics identified in the bit field instantiation, route policy module 38 may determine a bit field preference value for each dynamically redefined bit-field using the sub-mappings also defined by the one of policies 46, as shown in the example above.

After setting each bit field of the dynamically redefined local preference value, route policy module 38 may return local preference value 52 to BGP 40 in a format required by the industry standard. BGP 40 may store this local preference value within route table 54 in an entry created for route 50 as a single parameter defined by the routing protocol. In other words, BGP 40 may update the entry maintained for route 50 within route table 54 with local preference value 52 and thereby associate local preference value 52 with route 50. At some point, route resolution module 42 may resolve route table 54 in the manner described above and install the resolved routes into forwarding table 58 of FIB 60.

Assuming that route 50 comprises a route that reaches the same destination as another route, these two routes, route 50 and the other route, represent overlapping routes. Route resolution module 52 may resolve these routes by first considering the local preference value as an integer value. Route resolution module 52 may select the highest local preference value. While described with respect to selecting the route with a highest local preference value, router resolution module 52 may instead select a route with a lowest local preference value, which may occur with respect to a route resolution module 52 that implements different protocols or extensions to these and other protocols, including BGP multi-exit descriminator.

As in the above example, the techniques dynamically redefine the local preference value but do not impact any other functional aspect of either BGP 40 or route resolution module 42. Route resolution module 52 may proceed to select the one of the overlapping routes associated with the highest local preference value in the manner described above. However, because router 12A implements the techniques described herein, admin 44 may control route resolution module 42 without having to enter an exponential number of commands in order to define the one of policies 46. Rather admin 44 may only enter a linear number of commands and thus the techniques may improve a usability aspect of router 12A.

In any event, upon installing the resolved routes into forwarding table 58, forwarding plane 26B may receive packets, extract the five-tuple or a portion thereof (e.g., a destination address), access forwarding table 58 based on the extracted five-tuple or portion thereof (e.g., the destination address), determine a next hop (e.g., one of IFCs 28) associated with the five-tuple or portion thereof (e.g., again, the destination address) in an accessed entry of forwarding table 58, and forward the packet via the identified one of IFCs 28. In this manner, forwarding table 26B may provide the forwarding functionality of router 12A to forward, typically with high efficiency, packets via resolved routes.

Figure 3:
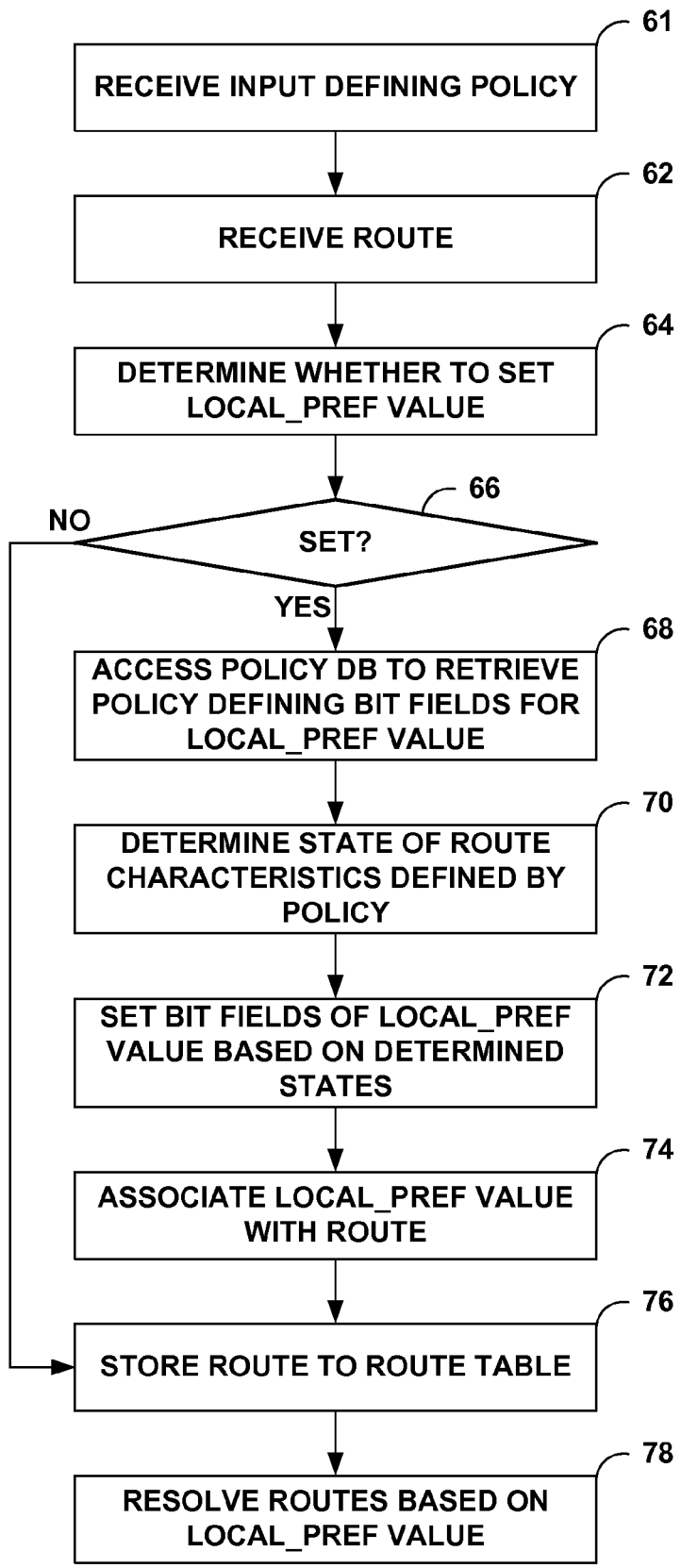
FIG. 3 is a flow chart illustrating an example operation of a router in implementing the techniques described in this disclosure.

FIG. 3 is a flow chart illustrating an example operation of a router in implementing the techniques described in this disclosure. For illustrative purposes, the techniques are described below with respect to router 12A of FIG. 2. However while described with respect to this particular type of network device, e.g., router 12A, the techniques may be implemented by any network device capable of implementing a routing protocol so as to redefine an integer value normally as a set of two or more bit fields and thereby improve a usability aspect of that network device. Moreover, while described below with respect to a particular exemplary embodiment of router 12A, the techniques may apply to other embodiments of router 12A.

Initially, UI module 28 may present a user interface with which admin 44 may interact to input, either directly or indirectly, data defining one of policies 46 (61). This one of policies 46 may comprise a decision policy, rather than an import or export policy. This one of policies 46 may therefore be referred to as a decision policy 46 insomuch as this one of policies 46 defines a set of rules, e.g., the policy mapping, that impact the decision process in the manner described above by setting the local preference value. Yet, a decision policy may represent a modified one of an import or export policy and thus, this one of policies 46 may comprise a modified import policy. In this way, the administrator is able to first specify a set of route characteristics of interest and a mapping of each of those characteristics to a corresponding set of bits within the local preference value. The administrator may further specific acceptable states for each of the route characteristics. Subsequently, the administrator may enter one or more additional policies 46 in the form of import policies that control the import of routes into RIB 46 of export policies that control the export of routes from RIB 46 to other routers or network devices that implement routing protocols. The UI module uses the mapping information first supplied by the administrator so that these additional policies are expressed with respect to only the necessary and relevant route characteristics, thereby allowing the user to avoid entering configuration for the total cross-product unique combinations of characteristics and their state. UI module 28 receives this input defining the policies and stores policies to policy data base 48.

Meanwhile, forwarding plane 26B may receive via one of IFCs 28 a BGP update message, e.g., one of BGP update messages 18, defining a new or updating an existing route (62). Forwarding plane 26B may extract a five-tuple or portion thereof (e.g., a destination address) from a header, e.g., IP header, of this one of BGP update message 18 and use this five-tuple as a key when accessing forwarding table 58 of FIB 60. Forwarding plane 26B may retrieve a forwarding table entry that causes forwarding plane 26B to forward the one of BGP update messages 18 to routing plane 26A. Routing plane 26A, as described above, may invoke BGP 40, which determines whether to set the local_pref value for the received route (64). As described above, BGP 40 may base this determination on a known configuration of a BGP peer, which in effect indicates whether the AS number of the peer is the same as the AS number of the router (66). If the AS number differs from the AS number that identifies AS 14A, e.g., message 18 is from an external BGP peer, BGP 40 may proceed to set the local_pref value ("YES" 66).

To set the local_pref value, BGP 40 may extract the route and any route characteristics defined by the one of BGP update messages 18 as route 50 to route policy module 38. The route characteristics may be defined, as described in more detail below, in so-called path attributes fields of the one of BGP update messages 18. These route characteristics may also be configured by an operator or network administrator as well in conjunction with or as an alternative to receiving the route characteristics via BGP update messages 18. Route policy module 38 may, in response to route 50, access policy DB 48 to retrieve the one of polices 46 (e.g., the above described decision policy 46) so as to dynamically redefine the local_pref value as two or more bit fields rather than treating the local_pref value as an integer (68). Next, route policy module 38 may determine a state of each route characteristic associated with a given one of the bit fields by the bit field instantiation defined by the decision policy 46, as described above (70).

Route policy module 38 may then, as described above, set each of the bit fields dynamically defined by decision policy 46 based on the determined states for each corresponding route characteristic (72). That is, route policy module 38 may access a first sub-mapping that maps each possible state for a first route characteristic associated with a first bit field to a bit field preference value and determine a bit field preference value associated with the determined state of the first route characteristic. Route policy module 38 may then set the identified bit field with the determined bit field preference value. Route policy module 38 may repeat this for each bit field defined in the bit field instantiation of the one of policies 46.

The following pseudo-code provides an exemplary representation of a policy:

```
//Instantiate Bit Fields of Local Preference Value
bit_field_1 = local_pref[31:16]
bit_field_2 = local_pref[15:0].
//Map Bit Fields to Route Characteristics
policy_mapping(validation_state, neighbor_relationship) {
    sub_map_1(bit_field_1, validation_state);
    sub_map_2(bit_field_2, neighbor_relationship);
}
sub_map_1(bit_field_1, validation_state) {
    if (validation_state == "valid") bit_field_1.set(2);
    if (validation_state == "uknown") bit_field_1.set(1);
    if (validation_state == "invalid") bit_field_1.set(0);
    return;
}
sub_map_2(bit_field_2, neighbor_relationship) {
    if (neighbor_relationship == "customer") bit_field_2.set(2);
    if (neighbor_relationship == "peer") bit_field_2.set(1);
    if (neighbor_relationship == "transit") bit_field_2.set(0);
    return;
}
```

The above exemplary decision policy first instantiates two bit fields (e.g., bit_field_1 and bit_field_2) via a bit field instantiation as the 16 most significant bits of the local preference (local_pref) value, e.g., bits 31 through 16, and the 16 least significant bits of the local_preference value, e.g., bits 15 through 0. Next, the exemplary decision policy provides for a policy mapping that takes two inputs, a validation state represented by variable validation_state and a neighbor relationship represented by a neighbor_relationship variable. The policy mapping includes two sub-mappings (e.g., sub_map_1 and sub_map_2), one for each of the two bit fields. The first sub-mapping sets the first instantiated bit field based on the state identified by the validation_state variable. The second sub-mapping sets the second instantiated bit field based on the state identified by the neighbor_relationship variable. Route policy module 38 may apply this exemplary decision policy represented as pseudo-code above to map the 16 most significant bits of the local_pref value to one of bit field preference values 2 (which is $0002_{16}$) through 0 (which is $0000_{16}$) and the 16 least significant bits of the local_pref value to one of bit field preference values 2 through 0. Here, notably, the user may specify these values in decimal notation rather than specify these values in hexadecimal or binary. The techniques may however set the local preference value in a bit-wise manner by converting these values from decimal to hexadecimal.

After setting all the bit fields in accordance with the decision policy, such as the exemplary decision policy provided above, route policy module 38 may return the local_pref value to BGP 40, which may associate the local_pref value with route 50 in route table 54 as described above (74, 76). If however BGP 40 determines that it should not set the local_pref value, e.g., the AS number of the one of BGP update messages 40 is the same as the AS in which router 12A resides, (which may be represented in the configuration by indicating that the peer is an internal rather than external peer), BGP 40 may store this route to route table 54 of RIB 56 without determining a local_pref value ("NO" 66, 76). Often, in this instance, where BGP 40 does not determine or set the local_pref value, a local_pref value has already been assigned by another router within AS 14A and BGP 40 may store this route along with the local_pref value previously determined by a different router of AS 14A in route table 54.

Route resolution module 42 may perform route resolution, e.g., implement the BGP decision process, in the manner described above to resolve routes stored to route table 54 based first on the local_pref value associated with each of these routes in route table 54 as described above (78). Upon completing route resolution, route resolution module 42 may install the resolved ones of the routes within forwarding table 58 of FIB 60 maintained by forwarding plane 26B. Forwarding plane 26 may then receive packets and forward those packets in accordance with the updated routes stored to forwarding table 58 of FIB 60.

Figure 4:
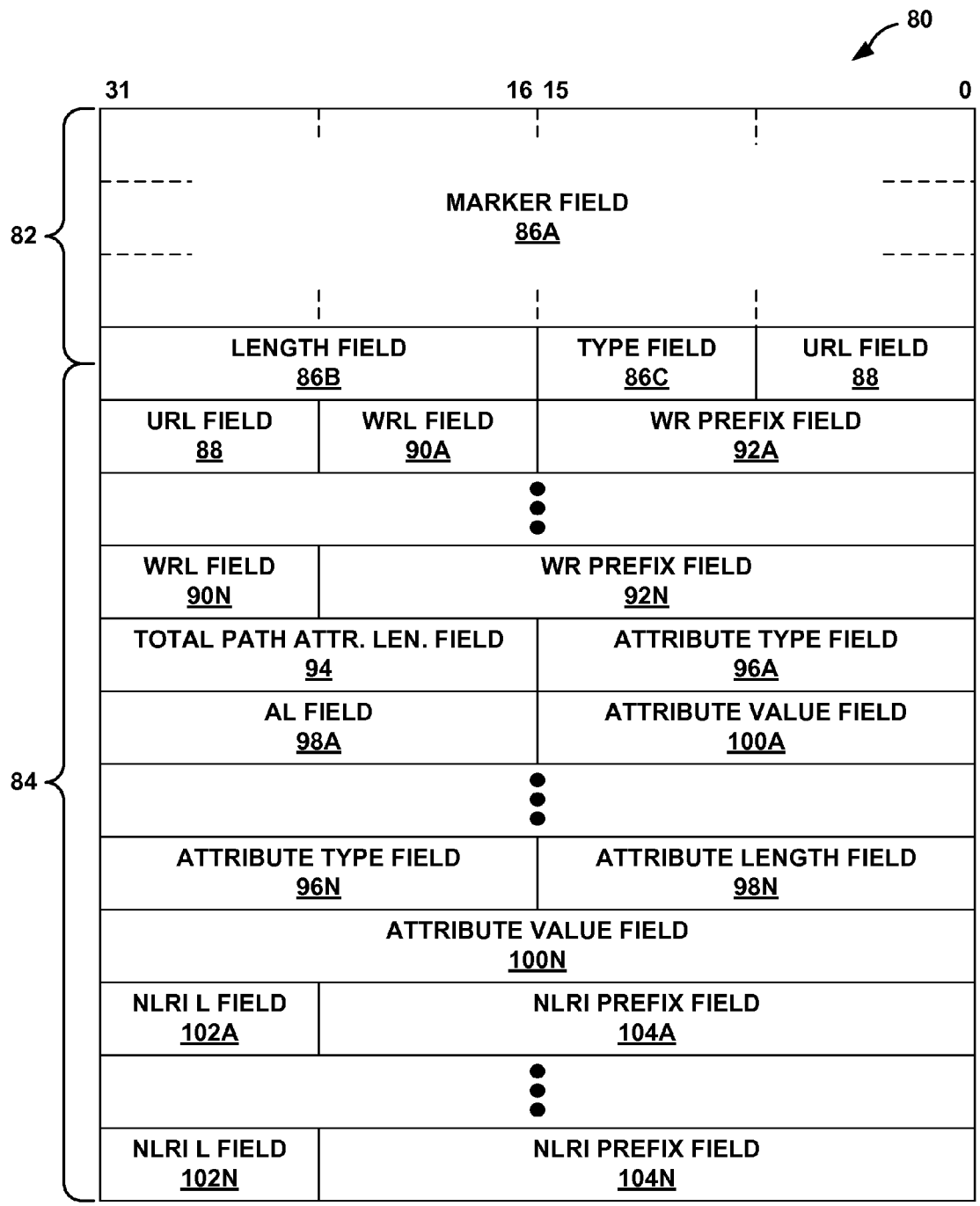
FIG. 4 is a block diagram illustrating an exemplary routing protocol message that defines a route and an associated local preference value.

FIG. 4 is a block diagram illustrating an exemplary routing protocol message 80 that defines a route and an associated local preference value. Routing protocol message 80 may represent an exemplary BGP update message and therefore may be referred to as BGP update message 80. While described with respect to a particular type of routing protocol, the techniques should not be limited strictly to BGP. Instead, the techniques may apply to any routing protocol.

As shown in FIG. 4, BGP update message 80 includes a BGP header 82 and a BGP payload 84. BGP header 82 includes marker field 86A, length field 86B and type field 86C. Marker field 86A provides a field that stores information used for synchronization and authentication purposes between BGP peers, such as routers 12A and routers 12B or 12C. Length field 86B comprises a field that stores data defining a total length of BGP update message 80 in bytes, including the fields of the header. Type field 86C comprises a field that stores a type of the BGP message, where the type is usually expressed as an integer value. For BGP update messages, type field 86C may store an integer value of two (2).

BGP payload 84 may comprise unfeasibility routes length field ("URL field 88"), withdrawn route length fields 90A-90N ("WRL fields 90") and corresponding withdrawn routes prefix fields 92A-92N ("WR prefix fields 92"), total path attribute length field 94 ("total path attr. len. field 94"), attribute type fields 96A-96N ("attribute type fields 96") and associated attribute length fields 98A-98N ("AL fields 98") and attribute value fields 100A-100N ("attribute value fields 100"), and network layer reachability information length fields 102A-102N ("NLRI L fields 102") and associated NLRI prefix fields 104A-104N ("NLRI prefix fields 104"). URL field 88 comprises a field that stores data defining a total length of the corresponding WRL fields 90 plus the WR prefix fields 90. Each of WRL fields 90 comprise a field that stores data defining a number of bits in an IP address defined by a corresponding one of WR prefix fields 90 that are significant. Each of WR prefix fields 90 comprise a field that stores data defining the IP address prefix of the network whose route is being withdrawn. If URL field 88 stores a zero value, BGP update message 80 may omit both WRL fields 90 and WR prefix fields 90. Each one of WRL fields 90 and a corresponding of WR prefix fields 90 may denote a withdrawn route, e.g., a route that is not longer to be considered by BGP and removed from route table 54.

Total path attribute length field 94 comprises a field that stores data defining a total length of the sum total of the length of each "path attributes" fields in bytes. A path attributes field may comprise one of fields 96 and corresponding ones of fields 98 and 100. Each of attribute type fields 96 may comprise a field that stores data defining a type of the path attribute value defined by a corresponding one of fields 100. Each of attribute length fields 98 may comprise a field that defines a length in terms of bytes for a corresponding one of fields 100. Attribute value fields 100 may each comprise a field that stored data defining a value for the attribute of the type indicated by a corresponding one of attribute type fields 96.

Each pair of NLRI length fields 102 and NLRI prefix fields 104 may define an IP address prefix for the route being advertised. Each of NLRI length fields 102 may, like WLR fields 90, comprise a field that stores data defining a number of bits in an IP address defined by a corresponding one of NLRI prefix fields 102 that are significant. Each of NLRI prefix fields 104 may comprise a field that stores data defining the IP address prefix of the network whose route is being advertised.

Router 12A and more particularly BGP 40 may generate BGP update message 80 and store within one of the path attributes defined by a corresponding set of fields 96-100 a local preference value calculated in accordance with the techniques described herein. An exemplary attribute type field is described in more detail with respect to the following FIG. 5A, where this type field signals that the corresponding one of attribute value fields stores a local_pref value is described below in more detail with respect to the following FIG. 5A. An exemplary attribute value field that stores a local_pref value determined in accordance with the techniques described herein is also described below with respect to the following FIG. 5B.

Figure 5A:
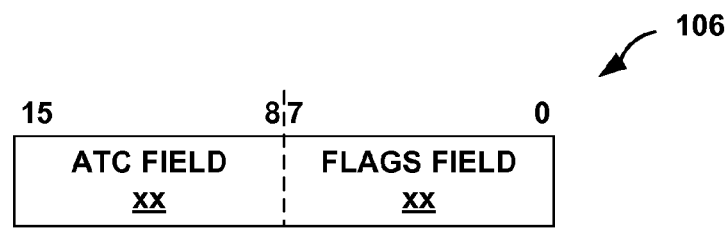
FIGS. 5A-5B are block diagrams illustrating, in more detail, an exemplary attribute type field and a corresponding exemplary attribute value field included within a routing protocol message.
Figure 5B:
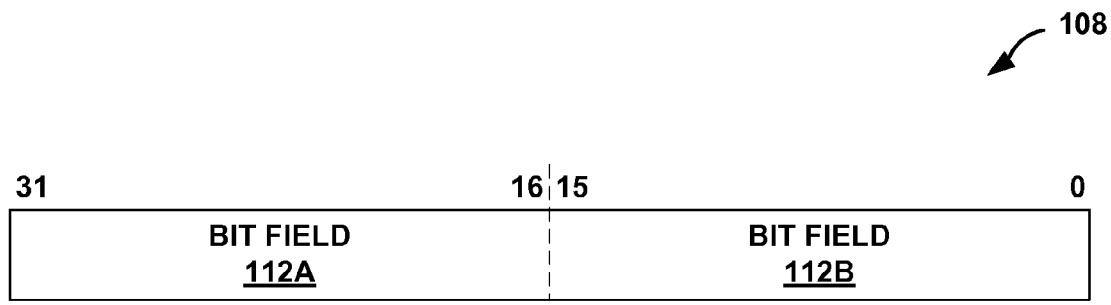

FIGS. 5A-5B are block diagrams illustrating, in more detail, an exemplary attribute type field 106 and a corresponding exemplary attribute value field 108 included within a routing protocol message. Attribute type field 106 may be substantially similar to any one of attribute type fields 96. Likewise, attribute value field 108 may be substantially similar to any one of attribute value fields 100.

As shown in FIG. 5A, attribute type field 106 can be redefined by the user in accordance with the techniques described herein to comprise sub-fields, an attribute type code field 110A ("ATC field 110A") and an attribute flags field 110B ("flags field 110B"). Each of these sub-fields 110A, 110B may comprise one or more further sub-fields, which may be referred to as bit partitions so as not to be confused with the above described bit fields. However, these bit partitions may comprise a bit field. In any event, sub-field 110A referred to as ATC field 110A may store an integer value that identifies a "type" of data stored to corresponding attribute value field 108. ATC field 110A stores data defining an integer value of five (5) to indicate or signal to BGP module 40 that corresponding attribute value field 108 stores a local_pref value.

Sub-field 110B may comprise a plurality of bit partitions, which, while not shown in detail in FIG. 5A, may store data defining a state for each of an optional flag, a transitive flag, a partial flag and an extended length flag. Each of these flags may indicate various characteristics of the attribute stored or defined by corresponding attribute value field 108. For example, optional flag may indicate if the attribute defined by corresponding attribute value field 108 is optional or not. These flags generally therefore reflect a status of the attribute defined by ATC field 110A and corresponding attribute value 108.

As shown in FIG. 5A, attribute value field 108 comprises a 32 bit field that stores a value. Assuming ATC field 110A of corresponding attribute type field 106 stores a five and therefore indicates that attribute value field 108 defines a local_pref value, attribute value field 108 comprises a 32-bit field that stores a local_pref value. With respect to BGP, the local_pref value is viewed as a 32-bit integer value. However, as further shown in FIG. 5A, route policy module 38 may dynamically redefine this field as a plurality of bit fields, such as bit fields 112A and 112B ("bit fields 112"). Each of these bit fields 112 may comprise a 16-bit field that stores a preference value associated with a state of a corresponding route characteristic. Notably, these bit fields 112 are logical bit fields in that BGP views this local_pref value as an integer value rather than viewing this value as a composition of separate bit fields 112.

In this respect, the techniques may logically redefine the local_pref value for purposes of better controlling route resolution or the BGP decision process in the manner described above. Notably, by so redefining the local_pref value, each of bit fields 112 are inherently ranked when once again viewed as an integer value, thereby imposing a set order on the preferential selection between associated route characteristics of which an administrator, such as admin 44, should be aware.

For example, assuming bit field 112A is associated with a validation state route characteristic and bit field 112B is associated with a neighbor relationship route characteristic, similar to that assumed above for purposes of illustration, bit field 112A is by virtue of comprising the 16 most significant bits of the local_pref value considered before bit field 112B, when the local_pref value is viewed as an integer. In other words, if a validation state associated with a preference value of $0001_{16}$ is set for a first local_pref value of a first overlapping route while a validation state associated with a preference value of $0002_{16}$ is set for a second local_pref value of a second overlapping route, route resolution module 42 may select the second overlapping route over the first overlapping route regardless of the value set for bit field 112B, as no matter what the value of bit field 112B for both the first and second local_pref value, the resulting second local_pref value, when viewed as an integer, will always be greater than the first local_pref value. In this respect, the validation state route characteristic is inherently an order of importance or preference above the neighbor relationship route characteristic.

In effect, route resolution module 42 may only base the route resolution on a bit field that includes the most significant bits of the local_pref value and, only when this most significant bit field of two local_pref values denotes the same value the same for two local_pref values will route resolution module 42 base the route resolution on a bit field that includes less significant bits of the local_pref values. In the above example, if the two local_pref values are both associated with overlapping routes having a same validation state but different neighbor relationships, route resolution module 42 selects the one of the overlapping routes having the neighboring relationship associated with a higher preference value. The successive bit fields instantiated as comprising less significant bits of the local_pref value may therefore define tie-breaker values to break ties that result in bit fields instantiated as comprising more significant bits of the local_pref value.

Notably, this inherent ordering occurs as a result of BGP continuing to view the local_pref path attribute value as an integer, as stated above, however maintaining this integer view provides many ancillary benefits. First, by so maintaining this integer view rather than providing for another path attribute, such as a new BGP community type, the techniques may conserve bandwidth, as appending yet another new BGP community further increases the size of BGP update messages. Second, maintaining this integer view, as described above, enables the techniques to preserve interoperability inasmuch as other routers, who naturally view the local_pref value as an integer, may continue to so construe the local_pref value as an integer. In this respect, the techniques may enable scalability and provide for slow adoption of the techniques within a given AS. That is, router 12A may, for example, implement the techniques and still interoperate with other routers of AS 14A. As the service provider of AS 14A purchases successive routers that implement the techniques, these successive routers may be incrementally placed into AS 14A and still interoperate with the older routers, who may be adapted manually to implement loosely the techniques described herein. Third, the techniques may maintain this integer view so as limit if not prevent changes to route resolution module 42 needed to comprehend the logical bit fields of the local_pref value. Route resolution module 42 is typically a highly complex routing process that is instrumental in selecting appropriate routes through the network. If changes were needed to route resolution module 42, these changes may be improperly implemented or otherwise provide software bugs that may lead to routing failures. Considering that the Internet relies on high degrees of speed and efficiency to meet consumer or customers high standards for Internet access, these routing failures may substantially impact Internet service and impact substantially business relationships.

Moreover, as described above, the techniques may enable a policy to be defined that specifies fewer rules. Not only does this facilitate a human or other usability aspect of routers that implement these techniques, but these policies may be smaller in size due to the reduction of the number of rules. Considering that the techniques reduce the number of rules required to define a policy from an exponential number of rules to a linear number of rules, these policies defined in accordance with the techniques may require substantially less router resources, e.g., router memory, to store or otherwise maintain.

While described above as being input by a user, such as admin 44, the techniques may be implemented transparently to the user, such that router 12A, for example, automatically reserves and sets certain bit fields when defining a local_pref value. This transparent aspect of the techniques may therefore be said to occur "under the covers." The techniques therefore should not be construed as requiring an administrator to define a policy. Instead, the techniques may be implemented such that the policy is automatically generated without user input in response to a specific configuration or, in some instance, such that the policy is statically defined prior of delivery to the user and enabled via a configuration command.

Various embodiments of the invention have been described. These and other embodiments are within the scope of the following claims.

The invention claimed is:

1. A method comprising:
storing, with a router of a network, information describing a plurality of routes, wherein each of the routes defines a sequence of hops through the network to a destination;
storing, with the router, data defining rules by which the router determines a local preference value for at least one of the plurality of routes, wherein the local preference value is specified by a routing protocol implemented by the router as an integer value, wherein the router, in accordance with the routing protocol, utilizes the local preference value during route resolution to rank and select one or more of the routes, and wherein the rules redefine the local preference value from the integer value specified by the routing protocol to two or more bit fields, and wherein the rules associate each of the bit fields with a different route characteristic and define a mapping, for each of the different route characteristics, that associates a bit-field preference value with each possible state of the corresponding route characteristic;
determining, with the router, a state for each of the different route characteristics defined by the mapping;
determining an integer value for the local preference value by setting, with the router, each of the two or more bit fields of the local preference value with one of the bit field preference values associated with the determined states in the mapping; and
associating, with the router, the at least one of the routes with the determined integer value of the local preference value.

2. The method of claim 1, further comprising:
presenting a user interface having an input syntax by which the user enters the bit-field preference values for each route characteristic independent from the other route characteristics as if the bit-field preference values where independent parameters; and
executing the routing protocol with the router to perform route resolution to rank and select one or more of the routes based on the determined integer value for the local preference value using the local preference value as a single parameter in the routing protocol.

3. The method of claim 1, wherein storing data defining a number of rules comprises storing data defining a linear number of rules with respect to the total number of the possible states for each of the route characteristics.

4. The method of claim 1, further comprising:
generating a message in accordance with the routing protocol that defines the at least one route and the local preference value determined for the at least one route; and
forwarding the message to another router included within the network and different from the router that describes the at least one route and the local preference value determined for the at least one route.

5. The method of claim 4,
wherein the message comprises an update message generated in accordance with the Border Gateway Protocol (BGP),
wherein the BGP update message includes a local preference (local_pref) field that defines the local preference value determined for the at least one route.

6. The method of claim 1, wherein each of the different route characteristics comprise a different one of a neighbor relationship, a route validation state, a community type, an available bandwidth, a total bandwidth, an Autonomous System (AS) path ("AS_Path"), an IGP area or level of source route, a source protocol, a source instance, and an origin attribute.

7. The method of claim 1,
wherein the at least one of the plurality of routes comprises a first route that defines a plurality of hops through the network to a destination,
wherein the local preference value comprises a first local preference value that is associated with the first route,
wherein a second one of the plurality of routes defines a different plurality of hops through the network to the same destination defined by the first route, and
wherein the second one of the plurality of routes is associated with a second local preference value,
the method further comprising performing, with the router, route resolution to select either the first route or the second route based on the first and second local preference values.

8. The method of claim 7, wherein performing route resolution comprises:
determining whether the first local preference value is greater than the second local preference value; and selecting the first route based on the determination that the first local preference value is greater than the second local preference value.

9. The method of claim 7, wherein performing route resolution comprises:
determining whether the first local preference value is greater than the second local preference value; and
selecting the first route based on the determination that the first local preference value is less than the second local preference value.

10. The method of claim 7, further comprising:
installing the selected one of the first or second routes in a forwarding plane of the router; and
forwarding, with the forwarding plane of the router, packets in accordance with the installed route.

11. The method of claim 1, wherein associating, with the router, the at least one of the routes with the determined local preference value comprises storing the local preference value and the at least one of the routes within a single entry of a routing table maintained by a routing plane of the router.

12. The method of claim 1, further comprising:
receiving the information defining the plurality of routes via a routing protocol; and
receiving the data defining the rules from an administrator via a user interface presented by a user interface module included within the router.

13. A router comprising:
at least one interface card that receives a routing protocol message in accordance with a routing protocol, each of which defines information that describes one or more of a plurality of routes, wherein each of the routes defines a sequence of hops through the network to a destination; and
a control unit that stores data defining rules by which the router determines a local preference value for at least one of the plurality of routes, wherein the preference value is specified by the routing protocol implemented by the router as an integer value, wherein the router, in accordance with the routing protocol, utilizes the preference value during route resolution to rank and select one or more of the routes, and wherein the rules redefine the local preference value specified by the routing protocol as two or more bit fields, and wherein the rules associate each of the bit fields with a different route characteristic and define a mapping, for each of the different route characteristics, that associates a bit field preference value with each possible state of the corresponding route characteristic,
wherein the control unit further determines a state for each of the different route characteristics defined by the mapping, sets each of the two or more bit fields of the local preference value with one of the bit field preference values associated with the determined states in the mapping to determine an integer value for the local preference value and associates the at least one of the routes with the determined integer value of the local preference value.

14. The router of claim 13, wherein the control unit includes:
a user interface module that presents a user interface having an input syntax by which the user enters the bit-field preference values for each route characteristic independent from the other route characteristics as if the bit-field preference values where independent parameters; and
a routing protocol module that executes the routing protocol to perform route resolution to rank and select one or more of the routes based on the determined integer value for the local preference value using the local preference value as a single parameter in the routing protocol.

15. The router of claim 13, further comprising a policy database that stores data defining a linear number of rules with respect to the total number of the possible states for each of the route characteristics.

16. The router of claim 13,
wherein the control unit comprises a routing protocol module that generates a message in accordance with the routing protocol that defines the at least one route and the local preference value determined for the at least one route, and
wherein the at least one interface card forwards the message to another router included within the network and different from the router that describes the at least one route and the local preference value determined for the at least one route.

17. The router of claim 16,
wherein the message comprises an update message generated in accordance with the Border Gateway Protocol (BGP),
wherein the BGP update message includes a local preference (local_pref) field that defines the local preference value determined for the at least one route.

18. The router of claim 13, wherein each of the different route characteristics comprise a different one of a neighbor relationship, a route validation state, a community type, an available bandwidth, a total bandwidth, an Autonomous System (AS) path ("AS_Path"), an IGP area or level of source route, a source protocol, a source instance, and an origin attribute.

19. The router of claim 13,
wherein the at least one of the plurality of routes comprises a first route that defines a plurality of hops through the network to a destination,
wherein the local preference value comprises a first local preference value that is associated with the first route,
wherein a second one of the plurality of routes defines a different plurality of hops through the network to the same destination defined by the first route,
wherein the second one of the plurality of routes is associated with a second local preference value, and
wherein he control unit further performs route resolution to select either the first route or the second route based on the first and second local preference values.

20. The router of claim 19, wherein the control unit includes a route resolution module that determines whether the first local preference value is greater than the second local preference value, and selects the first route based on the determination that the first local preference value is greater than the second local preference value.

21. The router of claim 19, wherein the control unit includes a route resolution module that determines whether the first local preference value is greater than the second local preference value and selecting the first route based on the determination that the first local preference value is less than the second local preference value.

22. The router of claim 19, wherein the control unit includes:
a forwarding plane; and
a routing plane that comprises a route resolution module, wherein the route resolution module installs the selected one of the first or second routes in a forwarding plane of the router, and
wherein the forwarding plane forwards packets in accordance with the installed route.

23. The router of claim 13, further comprising a routing information base that stores the local preference value and the at least one of the routes within a single entry of a routing table.

24. The router of claim 13, wherein the control unit includes:
a routing protocol module that receives the information defining the plurality of routes via a routing protocol; and
a user interface module that presents a user interface by which to receive the data defining the rules from an administrator.

25. A network system comprising:
a first autonomous system that includes a first router; and
a second autonomous system that includes a second router, wherein the second router comprises:
at least one interface card that receives a routing protocol message in accordance with a routing protocol from the first router, each of which defines information that describes one or more of a plurality of routes, wherein each of the routes defines a sequence of hops through the network to a destination; and
a control unit that stores data defining rules by which the second router determines a local preference value for at least one of the plurality of routes, wherein the preference value is specified by the routing protocol implemented by the second router as an integer value, wherein the second router, in accordance with the routing protocol, utilizes the preference value during route resolution to rank and select one or more of the routes, and wherein the rules redefine the local preference value specified by the routing protocol as two or more bit fields, and wherein the rules associate each of the bit fields with a different route characteristic and define a mapping, for each of the different route characteristics, that associates a bit field preference value with each possible state of the corresponding route characteristic,
wherein the control unit further determines a state for each of the different route characteristics defined by the mapping, sets each of the two or more bit fields of the local preference value with one of the bit field preference values associated with the determined states in the mapping and associates the at least one of the routes with the determined integer value of the local preference value.

26. A non-transitory computer-readable storage medium comprising instructions for causing a programmable processor to:
store, with a router of a network, information describing a plurality of routes, wherein each of the routes defines a sequence of hops through the network to a destination;
store, with the router, data defining rules by which the router determines a local preference value for at least one of the plurality of routes, wherein the local preference value is specified by a routing protocol implemented by the router as an integer value, wherein the router, in accordance with the routing protocol, utilizes the local preference value during route resolution to rank and select one or more of the routes, and wherein the rules redefine the local preference value from the integer value specified by the routing protocol to two or more bit fields, and wherein the rules associate each of the bit fields with a different route characteristic and define a mapping, for each of the different route characteristics, that associates a bit-field preference value with each possible state of the corresponding route characteristic;
determine, with the router, a state for each of the different route characteristics defined by the mapping;
determine an integer value for the local preference value by setting, with the router, each of the two or more bit fields of the local preference value with one of the bit field preference values associated with the determined states in the mapping; and
associate, with the router, the at least one of the routes with the determined integer value of the local preference value.

* * * * *